(12) United States Patent
Shirotori et al.

(10) Patent No.: US 10,502,926 B2
(45) Date of Patent: Dec. 10, 2019

(54) OPTICAL UNIT

(71) Applicant: NIDEC SANKYO CORPORATION, Nagano (JP)

(72) Inventors: Toshio Shirotori, Nagano (JP); Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 205 days.

(21) Appl. No.: 15/659,624

(22) Filed: Jul. 26, 2017

(65) Prior Publication Data

US 2018/0031803 A1 Feb. 1, 2018

(30) Foreign Application Priority Data

Jul. 29, 2016 (JP) ................. 2016-150064

(51) Int. Cl.
*G02B 7/02* (2006.01)
*G02B 7/105* (2006.01)

(52) U.S. Cl.
CPC ............. *G02B 7/105* (2013.01); *G02B 7/021* (2013.01); *G02B 7/022* (2013.01); *G02B 7/023* (2013.01); *G02B 7/026* (2013.01)

(58) Field of Classification Search
CPC ........ G02B 7/105; G02B 7/026; G02B 7/023; G02B 7/021; G02B 7/022
See application file for complete search history.

(56) References Cited

FOREIGN PATENT DOCUMENTS

| CN | 105103026 | 11/2015 | |
|---|---|---|---|
| EP | 3352445 A1 * | 7/2018 | ............ H04N 5/225 |
| JP | 2015210407 | 11/2015 | |
| KR | 100738380 | 7/2007 | |
| KR | 20150089680 | 8/2015 | |

OTHER PUBLICATIONS

"Office Action of China Counterpart Application," with machine English translation thereof, dated Sep. 12, 2019, pp. 1-20.

* cited by examiner

*Primary Examiner* — Joseph P Martinez
(74) *Attorney, Agent, or Firm* — JCIPRNET

(57) ABSTRACT

An optical unit is provided. In the optical unit, a holder holding part is provided with a guide part determining a first center axial line that is a reference and the tube part is provided with a guided part determining a second center axial line coincided with an optical axis of the lenses. A guided part is positioned by the guide part. A circuit board holding part is provided with a positioning part with which the circuit board is abutted and at least one of the circuit board holding part and the circuit board includes a fixed part through which the circuit board is fixed to the circuit board holding part so that a position of the circuit board to the circuit board holding part is capable of being adjusted in a direction perpendicular to the first center axial line.

17 Claims, 3 Drawing Sheets

OPTICAL UNIT

CROSS REFERENCE TO RELATED APPLICATION

The present invention claims priority under 35 U.S.C. § 119 to Japanese Application No. 2016-150064 filed on Jul. 29, 2016, the entire content of which is incorporated herein by reference.

BACKGROUND OF THE INVENTION

Field of the Invention

At least an embodiment of the present invention may relate to an optical unit in which a holder holding a plurality of lenses is attached to a base.

Description of Related Art

In order to attach a holder which holds a plurality of lenses to an optical device through a base, a structure has been proposed in which a female screw is formed on an inner peripheral face of a tube-shaped holder holding part of a base and a male screw is formed on an outer peripheral face of the holder. In this structure, when the plurality of the lenses is to be provided on an inner side of a tube part of the holder, first, an optical axis of a plurality of the lenses and a center axial line of the tube part are coincided with each other and, after that, the holder is screwed into the inner side of the tube-shaped holder holding part of the base (see Japanese Patent Laid-Open No. 2015-210407). Further, in this Patent Literature, deviation of the optical axis and its tilt may occur due to rattling between the male screw and the female screw and thus, a structure has been proposed that the holder holding part is provided with a cylindrical tube-shaped guide part and the holder is provided with a guided part which is fitted into the guide part.

Further, regarding a structure for providing a circuit board on which an imaging element is mounted, for example, in the paragraph [0021] in the above-mentioned Patent Literature, a structure has been proposed that a rear end face having a substantially rectangular outline for attaching the circuit board is integrally formed at a rear end of the base, and that a dimension of a part such as a positioning part at a center position of the imaging element is controlled to be a predetermined value and thereby a center vertical line passing the center of an imaging face of the imaging element is coincided with a center axial line of the holder holding part.

However, like the technique described in the above-mentioned Patent Literature, in order to coincide the optical axis of a plurality of lenses with the center vertical line passing through the center of an imaging face of the imaging element, even when a dimension of a part such as the positioning part determining a center position of the imaging element in the base is controlled, the optical axis and the center vertical line passing through the center of the imaging face of the imaging element may be displaced from each other due to, for example, a dimensional accuracy when the base is produced and, in this case, a problem such that a viewing angle is narrowed is occurred.

SUMMARY OF THE INVENTION

In view of the problem described above, at least an embodiment of the present invention may advantageously provide an optical unit in which an optical axis of a lens is capable of being coincided with a center axial line that is a reference, and in which a deviation between the optical axis and a center vertical line passing through the center of an imaging face of an imaging element can be restrained.

According to at least an embodiment of the present invention, there may be provided an optical unit including a plurality of lenses, an imaging element which receives light transmitted through the plurality of the lenses, a circuit board on which the imaging element is mounted, a holder provided with a tube part which holds the plurality of the lenses on its inner side, and a base provided with a holder holding part in a tube shape which holds the holder on its inner side and a circuit board holding part which holds the circuit board. An inner peripheral face of the holder holding part is provided with a guide part which determines a first center axial line that is a reference, and an outer peripheral face of the tube part is provided with a guided part which determines a second center axial line coincided with an optical axis of the plurality of the lenses. The guided part is positioned by the guide part so that the first center axial line and the second center axial line are coincided with each other, and the circuit board holding part is provided with a positioning part with which the circuit board is abutted from an opposite side to an object side. In addition, at least one of the circuit board holding part and the circuit board includes a fixed part through which the circuit board is fixed to the circuit board holding part so that a position of the circuit board to the circuit board holding part is capable of being adjusted in a direction perpendicular to the first center axial line.

In at least an embodiment of the present invention, when the holder in which a plurality of the lenses is incorporated into the tube part of the holder is to be assembled to the base, the guided part of the holder is guided by the guide part of the base and the second center axial line of the holder (the optical axis of the plurality of the lenses) and the first center axial line which is a reference are coincided with each other. Therefore, even when rattling is existed between the male screw and the female screw, a tilt of the second center axial line (the optical axis of the plurality of lenses) with respect to the first center axial line and its positional displacement in the direction perpendicular to the optical axis are restrained. Further, the circuit board holding part is provided with the positioning part with which the circuit board is abutted from an opposite side to the object side, and one of the circuit board holding part and the circuit board is provided with the fixed part for fixing the circuit board so as to be capable of adjusting a position of the circuit board with respect to the circuit board holding part in the direction perpendicular to the first center axial line. Therefore, the position in the optical axis direction of the imaging element and the position of the imaging element in the direction perpendicular to the optical axis direction can be set appropriately. Accordingly, a displacement between the optical axis of the plurality of lenses and the center vertical line passing through the center of the imaging face of the imaging element can be restrained.

In at least an embodiment of the present invention, the fixed part is a hole through which a screw for fixing the circuit board to the base is penetrated, and an inner diameter of the hole is larger than an outer diameter of the screw. Therefore, the position of the imaging element is shifted in the direction perpendicular to the optical axis direction and thereby the position of the center vertical line passing through the center of the imaging face of the imaging element can be adjusted with respect to the optical axis of the plurality of the lenses and, after that, the circuit board is fixed to the base by the screw. Specifically, it may be structured that the circuit board holding part of the base is provided with a body part in a tube shape which is protruded toward an outer side in a radial direction from an end part on the opposite side to the object side of the holder holding part and protruded to an imaging element side, the hole is provided in each of the body part and the circuit board so as to be penetrated through, and an end face on the imaging element side of the body part is formed to be a positioning flat face as the positioning part with which the circuit board is abutted. Alternatively, it may be structured that the circuit board is provided with the hole which penetrates through the circuit board, and an end face on the imaging element side of the body part is formed to be a positioning flat face as the positioning part with which the circuit board is abutted.

In at least an embodiment of the present invention, an inner peripheral face of the holder holding part is formed with a female screw on the opposite side to the object side with respect to the guide part, and an outer peripheral face of the tube part is formed with a male screw meshing with the female screw on the opposite side to the object side with respect to the guided part. According to this structure, the holder can be fixed to the base through engagement of the female screw with the male screw. Further, the holder can be moved in the optical axis direction by turning the holder and thereby focusing adjustment can be performed easily. Specifically, it is preferable that an outer diameter of the guided part is larger than an outer diameter of the male screw, an inner diameter of the guide part is larger than an inner diameter of the female screw and the outer diameter of the male screw, and the guided part is positioned in a radial direction by the guide part so that the first center axial line and the second center axial line are coincided with each other. According to this structure, the holder can be moved in the optical axis direction by meshing of the female screw with the male screw, and the guided part can be positioned in the radial direction by the guide part so that the first center axial line and the second center axial line are coincided with each other.

In at least an embodiment of the present invention, the plurality of the lenses include a cemented lens overlapping with the male screw when viewed in a direction perpendicular to the optical axis. When the guided part of the holder is to be guided by the guide part of the base, a large stress is applied to the guided part from an outer side in the radial direction. However, when viewed in a direction perpendicular to the optical axis, the cemented lens is located at a position overlapping with the male screw and is not provided at a position overlapping with the guided part. Therefore, a large stress is hard to be applied to the cemented lens and thus a problem such as deformation and separation of the cemented lens is hard to be occurred.

In at least an embodiment of the present invention, an outer diameter of an intermediate part of the male screw in the optical axis direction is smaller than outer diameters of both end parts of the male screw which are adjacent to the intermediate part in the optical axis direction. According to this structure, when the tube part is to be fixed to the holder holding part by using the male screw and the female screw, a stress applied from an outer side in the radial direction to a portion where the male screw is formed can be reduced. Therefore, the stress applied to the cemented lens can be reduced.

In at least an embodiment of the present invention, a thickness-reducing recessed part is formed between an inner peripheral face of the tube part and the outer peripheral face of the tube part so as to be recessed from an end part on the opposite side to the object side of the tube part, and the thickness-reducing recessed part is overlapped with the male screw when viewed in a direction perpendicular to the optical axis. According to this structure, in the portion of the tube part where the male screw is formed, a wall thickness difference between a portion on an inner side with respect to the recessed part in the radial direction and a portion on an outer side with respect to the recessed part in the radial direction can be set small. Therefore, shrinkage when the holder is to be resin-molded is hard to be occurred and thus the male screw can be formed with a high degree of accuracy. Further, when the holder is to be fixed to the base, even if a stress is applied to the tube part, the stress is absorbed by the recessed part. Therefore, a large stress is not applied to the lens.

In at least an embodiment of the present invention, the recessed part is overlapped with the guided part when viewed in the direction perpendicular to the optical axis. According to this structure, shrinkage when the holder is to be resin-molded is hard to be occurred and thus the guided part can be formed with a high degree of accuracy. Further, when the holder is to be fixed to the base, even if a stress is applied to the guided part, the stress is absorbed by the recessed part. Therefore, a large stress is not applied to the lens.

In at least an embodiment of the present invention, the guided part is provided with a flat face part faced to a direction perpendicular to the second center axial line.

In at least an embodiment of the present invention, a parting line is located in the flat face part.

In at least an embodiment of the present invention, a focal position of the plurality of the lenses is shifted to the opposite side to the object side accompanied with a temperature rise, and a linear expansion coefficient of the holder is smaller than a linear expansion coefficient of the base. According to this structure, even in a case that a focal position is shifted accompanied with a rise in ambient temperature, the shift can be absorbed by displacement of the position of the imaging element due to a difference of the linear expansion coefficients of the holder and the base.

In at least an embodiment of the present invention, a focal position of the plurality of the lenses is shifted to the object side accompanied with a temperature rise, and a linear expansion coefficient of the holder is larger than a linear expansion coefficient of the base. According to this structure, even in a case that a focal position is shifted accompanied with a rise in ambient temperature, the shift can be absorbed by displacement of the position of the imaging element due to a difference of the linear expansion coefficients of the holder and the base.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

An optical unit to which the present invention is applied will be described below with reference to the accompanying drawings.

First Embodiment (Entire Structure)

Figure 1:
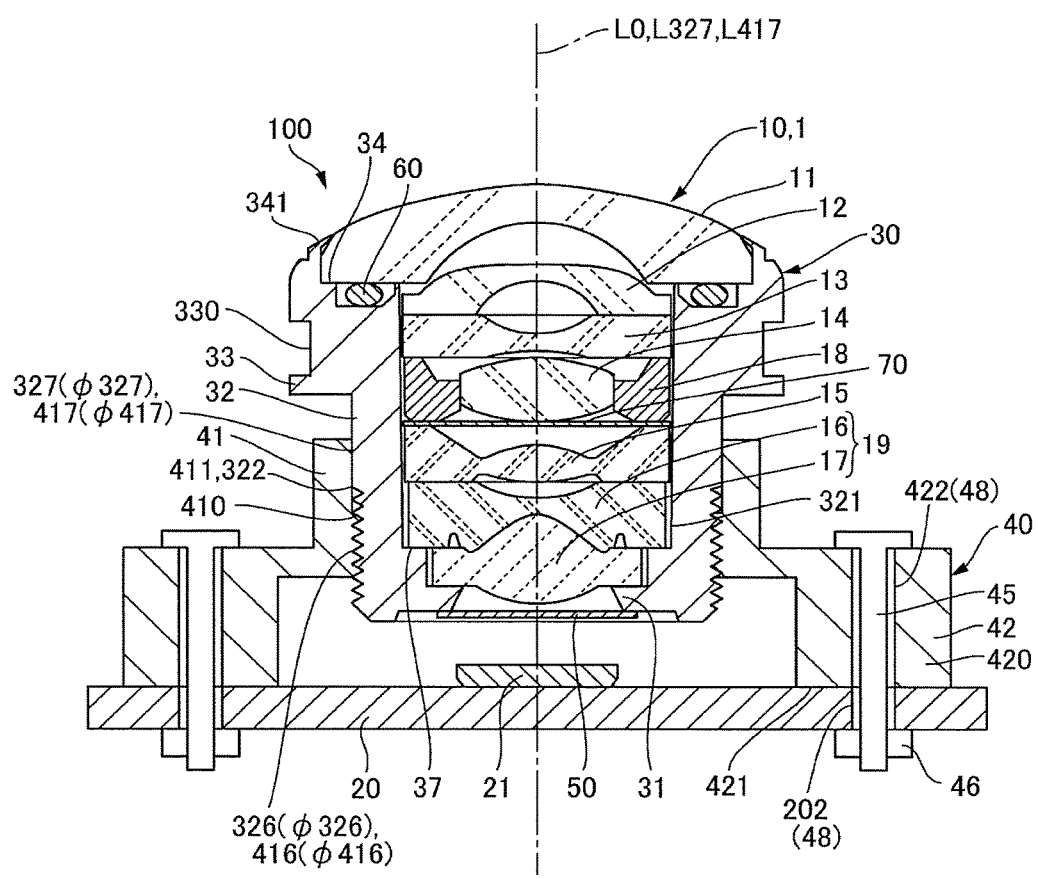
FIG. 1 is a cross-sectional view showing an optical unit in accordance with a first embodiment of the present invention.
Figure 2:
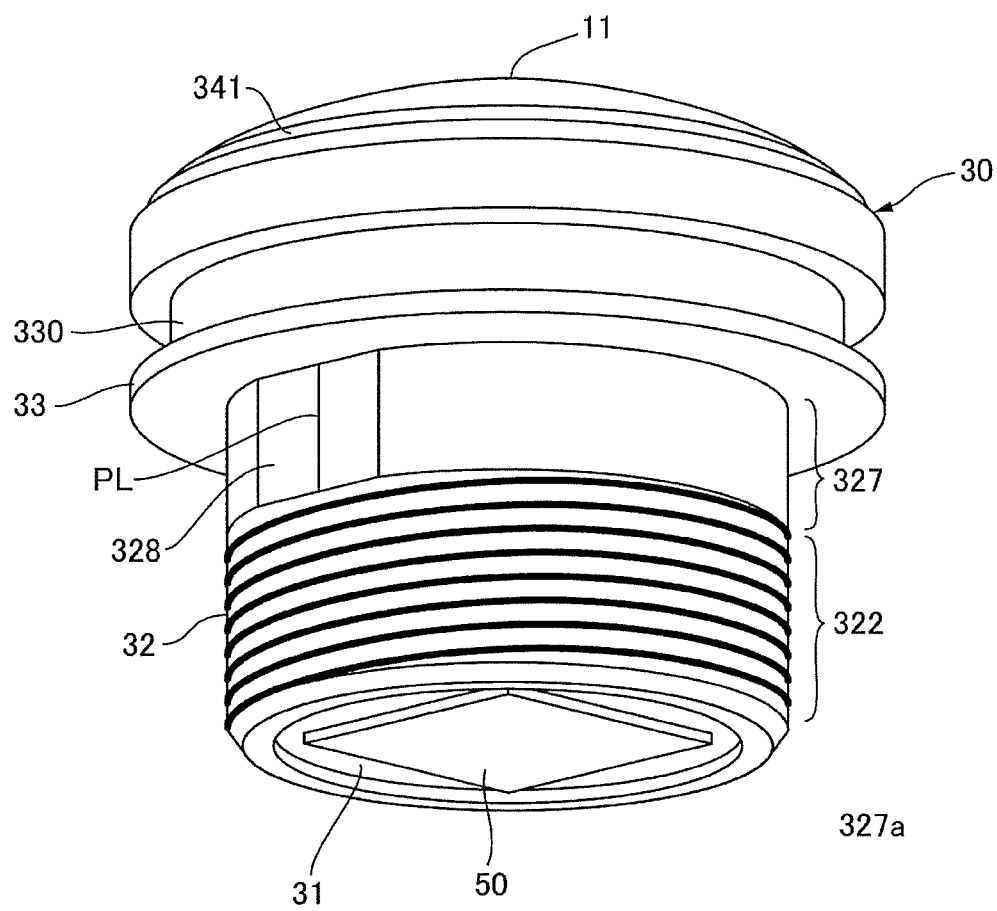
FIG. 2 is a perspective view showing a holder used in an optical unit in accordance with a first embodiment of the present invention which is viewed from an opposite side to an object side.

FIG. 1 is a cross-sectional view showing an optical unit 100 in accordance with a first embodiment of the present invention. FIG. 2 is a perspective view showing a holder 30 used in an optical unit 100 in accordance with a first embodiment of the present invention which is viewed from an opposite side to an object side.

As shown in FIG. 1, an optical unit 100 in this embodiment includes a plurality of lenses 10, an imaging element 21 which receives a light transmitted through the plurality of the lenses 10, a circuit board 20 on which the imaging element 21 is mounted on its object side face, and a holder 30 which holds the plurality of the lenses 10 on its inner side. The holder 30 is mounted on an imaging device (not shown) through a base 40. The circuit board 20 is held by the base 40.

The plurality of the lenses 10 constitutes a wide angle lens 1 having a lens constitution of seven lenses in six groups. More specifically, the wide angle lens 1 is constituted of a first lens 11, a second lens 12, a third lens 13, a fourth lens 14, a diaphragm 70, a fifth lens 15, a sixth lens 16 and a seventh lens 17 which are disposed in this order from an object side. Each of the first lens 11, the second lens 12, the third lens 13, the fourth lens 14 and the fifth lens 15 is a single lens. The sixth lens 16 and the seventh lens 17 constitute a cemented lens 19 in which a concave surface on the image side of the sixth lens 16 and a convex surface on the object side of the seventh lens 17 are cemented. The fourth lens 14 is held by the holder 30 in a state that the fourth lens 14 is supported by a ring 18. In the wide angle lens 1, outer diameter dimensions of the second lens 12, the third lens 13, the ring 18, the diaphragm 70, the fifth lens 15 and the sixth lens 16 are substantially the same as each other and an outer diameter dimension of the first lens 11 is larger than those of the second lens and the like. Further, an outer diameter dimension of the seventh lens 17 is smaller than those of the sixth lens and the like, and an outer peripheral portion of the sixth lens 16 is protruded to an outer side in a radial direction with respect to the seventh lens 17.

(Structure of Holder 30)

The holder 30 is provided with a frame-shaped bottom plate part 31 which holds an optical filter 50 such as an infrared filter at an end part on an opposite side to the object side and a cylindrical tube-shaped tube part 32 which is extended to the object side from the bottom plate part 31. The wide angle lens 1 (the plurality of the lenses 10) is disposed on an inner side of the tube part 32. The tube part 32 is provided with a large diameter part 33 from a substantially middle position in an optical axis "L0" direction to the object side, and an outer peripheral face of the large diameter part 33 is formed with a circumferential groove 330. An end part on the object side of the large diameter part 33 is formed with a recessed part 34 for disposing the first lens 11. A sealing member 60 made of rubber formed in a circular ring shape is disposed between the bottom part of the recessed part 34 and the first lens 11.

A ring-shaped step part 37 is formed in an inside of the tube part 32 at a position separated on the object side with respect to the bottom plate part 31. An outer peripheral portion of the sixth lens 16 is overlapped with the step part 37 from the object side. Therefore, in a state that the cemented lens 19 (the sixth lens 16 and the seventh lens 17), the fifth lens 15, the diaphragm 70, the ring 18 (the fourth lens 14), the third lens 13, the second lens 12 and the first lens 11 are disposed in this order on the inner side of the holder 30, when a ring-shaped protruded part 341 surrounding the recessed part 34 is caulked so as to cover an outer peripheral end part of the first lens 11 from the object side, the wide angle lens 1 is held on the inner side of the tube part 32 of the holder 30.

An outer peripheral face 322 of the tube part 32 of the holder 30 is formed with a male screw 326 in a portion overlapping with the cemented lens 19 when viewed in a direction perpendicular to the optical axis "L0". Further, a portion of the outer peripheral face 322 of the tube part 32 which is adjacent to the male screw 326 on the object side (from a portion holding the fifth lens 15 to the large diameter part 33) is formed with a guided part 327 formed in a circular circumference face. Therefore, the outer peripheral face 322 of the tube part 32 is formed with the male screw 326 on the opposite side to the object side with respect to the guided part 327. The guided part 327 is coaxially formed with a center axial line "L327" (second center axial line) which is coincided with the optical axis "L0" of the wide angle lens 1 and the center axial line "L327" is determined by the guided part 327. In other words, the wide angle lens 1 is positioned on an inner side of the tube part 32 so that the optical axis "L0" is coincided with the center axial line "L327". In this embodiment, an outer diameter φ327 of the guided part 327 is larger than an outer diameter φ326 of the male screw 326.

In the plurality of the lenses 10, the cemented lens 19 is provided at a position overlapping with a female screw 416 when viewed in a direction perpendicular to the optical axis "L0". In the cemented lens 19, a gap space is provided between the seventh lens 17 and an inner peripheral face 321 of the tube part 32. On the other hand, the lenses other than the seventh lens 17 are lightly press-fitted and held by the inner side face of the tube part 32. Alternatively, it may be structured that a rib is formed on the inner side face of the tube part 32 and the lenses other than the seventh lens 17 are lightly press-fitted on an inner side of the tube part 32 by utilizing the rib.

In this embodiment, the holder 30 is made of resin. Further, as shown in FIG. 2, the guided part 327 is provided with a flat part 328 which faces to a direction perpendicular to the center axial line "L327". Therefore, a circular peripheral face (outer peripheral face) of the guided part 327 except the flat part 328 is utilized as the substantial guided part 327a. Further, a parting line PL which is extended along the optical axis "L0" is located on the flat part 328 depending on a die when the holder 30 is manufactured. Therefore, except the flat part 328 in the guided part 327, the parting line PL does not exist on the circular peripheral face (substantial guided part 327a) and thus the substantial guided part 327a is formed in a circular arc face with a high degree of accuracy.

(Structure of Base 40)

In FIG. 1, the base 40 is provided with a holder holding part 41 in a tube shape, which is provided with a holder insertion hole 410 which holds the holder 30 on its inner side, and a circuit board holding part 42 provided with a body part 420 in a rectangular tube shape which is protruded toward an outer side in the radial direction from an end part of the holder holding part 41 on an opposite side to the object side. An inner peripheral face 411 of the holder holding part 41 is formed with the female screw 416, which is meshed with the male screw 326 of the holder 30, from a midway position in the optical axis "L0" direction to an end part on the opposite side to the object side. Further, on the inner peripheral face 411 of the holder holding part 41, a guide part 417 in a circular peripheral face is formed from a portion adjacent to the female screw 416 on the object side to an end part on the object side of the holder holding part 41. Therefore, the inner peripheral face 411 of the holder holding part 41 is formed with the female screw 416 on the opposite side to the object side with respect to the guide part 417. The guide part 417 is coaxially formed with the center axial line "L417" (first center axial line) which is a reference when the base 40 is to be mounted on an optical device and the guide part 417 determines the center axial line "L417". In this embodiment, an inner diameter φ417 of the guide part 417 is larger than an inner diameter φ416 of the female screw 416 and the outer diameter φ326 of the male screw 326 and is substantially equal to the outer diameter φ327 of the guided part 327. As a result, when the circular peripheral face (substantial guided part 327a) of the guided part 327 is guided and positioned by the circular peripheral face of the guide part 417, the center axial line "L417" (first center axial line) is coincided with the center axial line "L327" (second center axial line) of the guided part 327, in other words, the center axial line "L417" is coincided with the optical axis "L0" of the wide angle lens 1, and the holder 30 is positioned in the radial direction. The holder insertion hole 410 is provided with an inner diameter not less than the inner diameter φ416 of the female screw 416 over the whole in the optical axis "L0" direction, and the holder holding part 41 is formed with no protruded part which is protruded from the inner peripheral face 411 to an inner side.

In this embodiment, the cylindricity of each of the guide part 417 and the guided part 327 is not more than 20 μm. The cylindricity means an extent of deviation from a geometric cylindrical form of a portion which should be originally a normal circular cylindrical shape.

In the circuit board holding part 42 of the base 40, an end part of the body part 420 on the opposite side to the object side is formed to be a positioning part (positioning flat face) 421 with which the circuit board 20 is abutted from the opposite side to the object side. Further, the body part 420 is formed with a hole 422 which penetrates through the body part 420 in the optical axis "L0" direction, and a hole 202 which is a through hole is formed in the circuit board 20 at a position overlapping with the hole 422. Therefore, after screws 45 are fitted from the object side so as to penetrate through the holes 422 and 202, nuts 46 are fastened to the screws 45 and the circuit board 20 is fixed to the base 40.

In this embodiment, a fixed part 48 is provided in at least one of the circuit board holding part 42 and the circuit board 20 so that a position of the circuit board 20 is capable of being adjusted in the direction perpendicular to the center axial line "L417" with respect to the circuit board holding part 42 and that the circuit board 20 is capable of being fixed to the circuit board holding part 42. In this embodiment, the fixed part 48 is formed in both of the circuit board holding part 42 and the circuit board 20. More specifically, each of the holes 202 and 422 is formed to be the fixed part 48 whose inner diameters in two directions perpendicular to the center axial line "L417" are larger than an outer diameter of a shaft part of the screw 45. Therefore, when the nuts 46 are to be fitted to the screws 45 for fixing the circuit board 20 to the base 40, a relative position of the positioning part 421 (positioning flat face) to the circuit board 20 can be adjusted by shifting an upper flat face of the circuit board 20 with respect to the base 40 in two directions perpendicular to the center axial line "L417" before the nuts 46 are completely fastened.

(Manufacturing Method for Optical Unit 100)

In order to manufacture the optical unit 100 in this embodiment, first, the wide angle lens 1 is provided on an inner side of the holder 30. In this case, the center axial line "L327" of the guided part 327 (second center axial line) and the optical axis "L0" of the wide angle lens 1 are set to be coincided with each other. Further, the optical filter 50 is fixed to the bottom plate part 31 of the holder 30.

Next, after the screws 45 are provided so as to penetrate through the holes 202 and 422, nuts 46 are fitted to the screws 45 to temporarily fix the circuit board 20 to the base 40. Next, the holder 30 is inserted from the object side into the holder holding part 41 of the base 40. In this case, the holder 30 is rotated around the center axial line "L327" to insert the holder 30 on the inner side of the holder holding part 41 by a certain dimension while meshing the male screw 326 with the female screw 416. Further, in this case, the outer diameter φ327 of the guided part 327 is larger than the outer diameter φ326 of the male screw 326 and thus, even in a state that the male screw 326 is engaged with the female screw 416, the guided part 327 of the holder 30 is guided by the guide part 417 of the base 40. Therefore, the center axial line "L327" of the holder 30 (optical axis "L" of the wide angle lens 1) and the center axial line "L417" of the base 40 are coincided with each other.

Next, the holder 30 is turned while monitoring an output from the imaging element 21 and a position of the holder 30 in the holder holding part 41 is adjusted in a direction of the center axial line "L417" of the holder 30 and thereby focusing adjustment is performed. In this embodiment, a dimension in the optical axis "L0" direction of the male screw 326 is larger than that of the female screw 416 and, when the position in the center axial line "L417" direction of the holder 30 has been adjusted, screw threads of the male screw 326 are left by one pitch or more in a non-engaged state on both sides with respect to the meshed portion of the female screw 416 with the male screw 326.

Further, in this embodiment, an output from the imaging element 21 is monitored and deviation between a center of the imaging face of the imaging element 21 and an imaging center by the wide angle lens 1 is confirmed. In a case that the center of the imaging face of the imaging element 21 and the imaging center by the wide angle lens 1 are displaced from each other, the nuts 46 are loosened and the position of the circuit board 20 with respect to the base 40 is adjusted and thereby the center of the imaging face of the imaging element 21 and the imaging center by the wide angle lens 1 are coincided with each other. After that, the nuts 46 are fastened to fix the circuit board 20 to the base 40.

(Principal Effects in this Embodiment)

As described above, in the optical unit 100 in this embodiment, when the holder 30 in which a plurality of the lenses 10 is incorporated into the tube part 32 of the holder 30 is to be assembled to the base 40, the guided part 327 of the holder 30 is guided by the guide part 417 of the base 40, and the center axial line "L327" of the holder 30 (second center axial line, optical axis "L0" of the wide angle lens 1) and the center axial line "L417" (first center axial line) which is a reference of the base 40 are coincided with each other. Therefore, a tilt of the center axial line "L327" (optical axis "L0" of the wide angle lens 1) with respect to the center axial line "L417" which is the reference and a positional displacement in a direction perpendicular to the optical axis "L0" is restrained. Further, the circuit board holding part 42 of the base 40 is provided with the positioning part 421 with which the circuit board 20 is abutted from the opposite side to the object side, and the circuit board holding part 42 and the circuit board 20 are provided with the fixed parts 48 for fixing the circuit board so as to be capable of adjusting a position of the circuit board 20 with respect to the circuit board holding part 42 in the direction perpendicular to the center axial line "L417". Therefore, the position in the optical axis "L0" direction of the imaging element 21 and the position of the imaging element 21 in the direction perpendicular to the optical axis direction can be set appropriately. Accordingly, a displacement between the optical axis "L0" of the wide angle lens 1 and the center vertical line passing through the center of the imaging face of the imaging element 21 can be restrained and thus a large viewing angle can be obtained.

Further, the fixed part 48 is structured of the holes 202 and 422 through which the screw 45 for fixing the circuit board 20 to the base 40 is penetrated and is structured so that the inner diameters of the holes 202 and 422 are set to be larger than the outer diameter of the shaft part of the screw 45. Therefore, the position of the imaging element 21 is shifted in a direction perpendicular to the optical axis "L0" direction and thereby the position of the center vertical line passing through the center of the imaging face of the imaging element 21 can be adjusted with respect to the optical axis "L0" of the wide angle lens 1 and, after that, the circuit board 20 is fixed to the base 40 by the screws 45.

Further, the inner peripheral face 411 of the holder holding part 41 is formed with the female screw 416 on the opposite side to the object side with respect to the guide part 417, and the outer peripheral face of the tube part 32 is formed with the male screw 326 on the opposite side to the object side with respect to the guided part 327. Therefore, the holder 30 can be fixed to the base 40 through engagement of the female screw 416 with the male screw 326. Further, the holder 30 can be moved in the optical axis "L0" direction by turning the holder 30 and thus focusing adjustment can be performed easily.

Further, when the guided part 327 of the holder 30 is to be guided by the guide part 417 of the base 40, large stress is applied to the guided part 327 from an outer side in the radial direction. However, when viewed in a direction perpendicular to the optical axis "L0", the cemented lens 19 is located at a position overlapping with the male screw 326 and is not provided at a position overlapping with the guided part 327. Therefore, a large stress is hard to be applied to the cemented lens 19 and thus, a problem such that separation of the sixth lens 16 from the seventh lens 17 due to deformation of the sixth lens 16 is hard to be occurred in the cemented lens 19.

Further, in the holder holding part 41 of the base 40, the holder insertion hole 410 has an inner diameter not less than the inner diameter φ416 of the female screw 416 over the entire optical axis "L0" direction and the holder holding part 41 is formed with no protruded part which is protruded to an inner side from the inner peripheral face 411. Therefore, a movable range in the optical axis "L0" direction of the holder 30 is long in the holder holding part 41.

Second Embodiment

Figure 3:
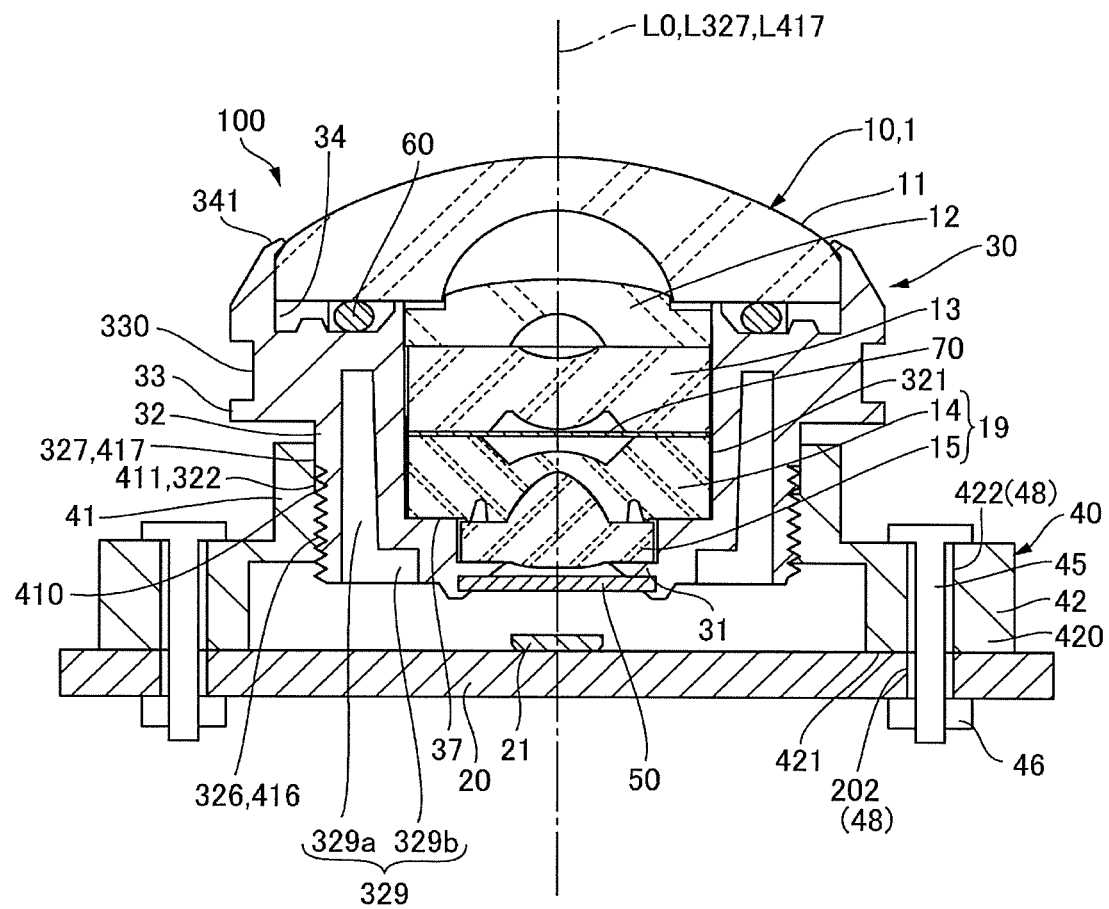
FIG. 3 is a cross-sectional view showing an optical unit in accordance with a second embodiment of the present invention.

FIG. 3 is a cross-sectional view showing an optical unit 100 in accordance with a second embodiment of the present invention. A basic structure in this embodiment is similar to the first embodiment and thus the same reference signs are used in common portions and their detailed descriptions are omitted.

As shown in FIG. 3, an optical unit 100 in this embodiment also includes, similarly to the first embodiment, a plurality of lenses 10, an imaging element 21 which receives a light transmitted through the plurality of the lenses 10, a circuit board 20 on which the imaging element 21 is mounted on its object side face, and a holder 30 which holds the plurality of the lenses 10 on its inner side. The holder 30 is mounted on an imaging device (not shown) through a base 40. The circuit board 20 is held by the base 40.

In the second embodiment, the plurality of the lenses 10 constitutes a wide angle lens 1 having a lens constitution of five lenses in four groups. More specifically, the wide angle lens 1 is constituted of a first lens 11, a second lens 12, a third lens 13, a diaphragm 70, a fourth lens 14 and a fifth lens 15 which are disposed in this order from an object side. The fourth lens 14 and the fifth lens 15 constitute a cemented lens 19 in which a concave surface on the image side of the fourth lens 14 and a convex surface on the object side of the fifth lens 15 are cemented.

Also in this embodiment, similarly to the first embodiment, the holder 30 is provided with a frame-shaped bottom plate part 31, which holds an optical filter 50 such as an infrared filter at an end part on an opposite side to the object side, and a cylindrical tube-shaped tube part 32 which is extended to the object side from the bottom plate part 31. An outer peripheral portion of the fourth lens 14 is overlapped with a step part 37 from the object side in an inside of the tube part 32.

An outer peripheral face 322 of the tube part 32 of the holder 30 is formed with a male screw 326 in a portion overlapping with the cemented lens 19 when viewed in a direction perpendicular to the optical axis "L0". Further, a portion of the outer peripheral face 322 of the tube part 32 which is adjacent to the male screw 326 on the object side (from a portion holding the fourth lens 14 to the large diameter part 33) is formed with a guided part 327 formed in a circular circumference face. The guided part 327 is coaxially formed with a center axial line "L327" (second center axial line) which is coincided with the optical axis "L0" of the wide angle lens 1 and the center axial line "L327" is determined by the guided part 327. In other words, the wide angle lens 1 is positioned on an inner side of the tube part 32 so that the optical axis "L0" is coincided with the center axial line "L327".

In the plurality of the lenses 10, the cemented lens 19 is provided at a position overlapping with a female screw 416 when viewed in a direction perpendicular to the optical axis "L0", and the cemented lens 19 is also overlapped with the guided part 327 when viewed in the direction perpendicular to the optical axis "L0". In this embodiment, a recessed part 329 for thinning wall-thickness is formed in a groove shape between an inner peripheral face 321 and an outer peripheral face 322 of the tube part 32 over its entire periphery so as to be recessed from an end part of the tube part 32 on the opposite side to the object side and overlapped with the male screw 326 when viewed in the direction perpendicular to the optical axis "L0". In this embodiment, the recessed part 329 is formed so as to be extended to an inner side in a radial direction of a large diameter part 33 and is overlapped with the guided part 327 when viewed in the direction perpendicular to the optical axis "L0". Further, the recessed part 329 is formed so that an opening width of a portion 329b formed in an end part on the opposite side to the object side is set to be wider than an opening width of a portion 329a overlapping with the guided part 327 in the radial direction. Therefore, a wall thickness difference between a portion of the tube part 32 located on an inner side with respect to the recessed part 329 in the radial direction and a portion of the tube part 32 located on an outer side with respect to the recessed part 329 in the radial direction is small in the portion of the tube part 32 where the male screw 326 and the guided part 327 are formed.

The base 40 is provided with a holder holding part 41 in a tube shape, which is provided with a holder insertion hole 410 which holds the holder 30 on its inner side, and a circuit board holding part 42 provided with a body part 420 in a rectangular tube shape which is protruded toward an outer side in the radial direction from an end part of the holder holding part 41 on the opposite side to the object side. An inner peripheral face 411 of the holder holding part 41 is formed with a female screw 416, which is meshed with the male screw 326 of the holder 30, from a midway position in the optical axis "L0" direction to an end part on the opposite side to the object side. Further, on the inner peripheral face 411 of the holder holding part 41, a guide part 417 in a circular peripheral face is formed from a portion adjacent to the female screw 416 on the object side to an end part on the object side of the holder holding part 41. The guide part 417 is coaxially formed with the center axial line "L417" (first center axial line) which is a reference when the base 40 is to be mounted on an optical device and the guide part 417 determines the center axial line "L417".

Also in this embodiment, in the holder holding part 41 of the base 40, the holder insertion hole 410 is provided with an inner diameter not less than the inner diameter φ416 of the female screw 416 over the whole in the optical axis "L0" direction, and the holder holding part 41 is formed with no protruded part which is protruded from the inner peripheral face 411 to an inner side. Therefore, a movable range in the optical axis "L0" direction of the holder 30 is long in the holder holding part 41.

In a circuit board holding part 42 of the base 40, an end part of the body part 420 on the opposite side to the object side is formed to be a positioning part (positioning flat face) 421 with which the circuit board 20 is abutted from the opposite side to the object side. Further, the body part 420 is formed with a hole 422 which penetrates through the body part 420 in the optical axis "L0" direction, and a hole 202 which is a through hole is formed in the circuit board 20 at a position overlapping with the hole 422. Therefore, after screws 45 are fitted from the object side so as to penetrate through the holes 422 and 202, nuts 46 are fastened to the screws 45 and the circuit board 20 is fixed to the base 40. Further, each of the holes 202 and 422 is formed to be the fixed part 48 whose inner diameters in two directions perpendicular to the center axial line "L417" are larger than an outer diameter of a shaft part of the screw 45. Therefore, when the nuts 46 are to be fitted to the screws 45 to fix the circuit board 20 to the base 40, a relative position of the circuit board 20 to the base 40 can be adjusted in two directions perpendicular to the center axial line "L417" before the nuts 46 are completely fastened.

Also in the optical unit 100 structured as described above, similarly to the first embodiment, when the holder 30 in which the plurality of the lenses 10 is incorporated into the tube part 32 is to be assembled to the base 40, the guided part 327 of the holder 30 is guided by the guide part 417 of the base 40, and the center axial line "L327" of the holder 30 (second center axial line, the optical axis "L0" of the wide angle lens 1) and the center axial line "L417" (first center axial line) which is a reference of the base 40 are coincided with each other. Therefore, a tilt of the center axial line "L327" (optical axis "L0" of the wide angle lens 1) with respect to the center axial line "L417" which is the reference and a positional displacement in the direction perpendicular to the optical axis "L0" is restrained. Further, the circuit board holding part 42 of the base 40 is provided with the positioning part 421 with which the circuit board 20 is abutted from the opposite side to the object side, and the circuit board holding part 42 and the circuit board 20 are provided with the fixed parts 48 for fixing the circuit board 20 so as to be capable of adjusting a position of the circuit board 20 with respect to the circuit board holding part 42 in the direction perpendicular to the center axial line "L417". Therefore, the position in the optical axis "L0" direction of the imaging element 21 and the position of the imaging element 21 in the direction perpendicular to the optical axis direction can be set appropriately. Accordingly, a displacement between the optical axis "L0" of the wide angle lens 1 and the center vertical line passing through the center of the imaging face of the imaging element 21 can be restrained and thus, similar effects to the first embodiment can be attained, for example, a large viewing angle is obtained.

Further, the recessed part 329 for reducing wall-thickness is formed in a groove shape between the inner peripheral face 321 and the outer peripheral face 322 of the tube part 32 over its entire periphery so as to be recessed from the end part of the tube part 32 on the opposite side to the object side and overlapped with the male screw 326 when viewed in the direction perpendicular to the optical axis "L0". Therefore, a wall thickness difference between the inner portion of the tube part 32 located on an inner side with respect to the recessed part 329 in the radial direction and the outer portion of the tube part 32 located on an outer side with respect to the recessed part 329 in the radial direction is small in the portion of the tube part 32 where the male screw 326 and the guided part 327 are formed. Accordingly, shrinkage when the holder 30 is to be resin-molded is hard to be occurred and thus the male screw 326 and the guided part 327 can be formed with a high degree of accuracy. Further, when the holder 30 is to be fixed to the base 40, even if stress is applied to the tube part 32, the stress is absorbed by the recessed part 329. Therefore, even in a structure that the fourth lens 14 used in the cemented lens 19 is contacted with the inner peripheral face 321 of the tube part 32, a large stress is not applied to the fourth lens 14. Accordingly, a problem such that deformation of the fourth lens 14, separation of the fourth lens 14 from the fifth lens 15, or the like is hard to be occurred.

Other Embodiments

In the above-mentioned first and second embodiments, the circuit board 20 is fixed to the base 40 by using the screw 45 and the nut 46. In this case, the fixing part 48 is structured so that the inner diameters of two holes 202 and 422 through which the screw 45 is penetrated are set to be larger than the outer diameter of the shaft part of the screw 45, and the circuit board is fixed so that the position of the circuit board 20 is capable of being adjusted with respect to the circuit board holding part 42 in a direction perpendicular to the center axial line "L417". However, the structure of the fixing part 48 is not limited to the above-mentioned structure. For example, the fixing part may be structured so that a threaded hole for fastening a screw 45 from the opposite side to the object side is formed in the base 40, and an inner diameter of the hole 202 of the circuit board 20 is set to be larger than the outer diameter of the shaft part of the screw 45, and thereby the position of the circuit board 20 with respect to the circuit board holding part 42 is capable of being adjusted in a direction perpendicular to the center axial line "L417".

In the first embodiment, a structure regarding an outer diameter of the screw in the optical axis "L0" direction of the male screw 326 is not specified. However, it is preferable that an outer diameter of the male screw 326 in an intermediate part in the optical axis "L0" direction is smaller than outer diameters of both end parts of the male screw 326 which are adjacent to the intermediate part in the optical axis "L0" direction. According to this structure, even in a case that the flat part 328 shown in FIG. 2 is provided in the holder 30, a foreign matter is hard to enter from the flat part 328 to an imaging element 21 side through a space between the male screw 326 and the female screw 416. Further, when the tube part 32 is to be fixed to the holder holding part 41 by using the male screw 326 and the female screw 416, stress applied from an outer side in the radial direction to a portion where the male screw 326 is formed can be reduced. Therefore, the stress applied to the cemented lens 19 can be reduced.

In the above-mentioned first and second embodiments, the holder 30 which holds the wide angle lens 1 is separately provided from the base 40 to which the circuit board 20 mounted with the imaging element 21 is fixed. Therefore, in a case that the focal position of the wide angle lens 1 (the plurality of the lenses 10) is shifted to an opposite side to the object side accompanied with a temperature rise (rise in ambient temperature), a structure can be preferably adopted that a linear expansion coefficient of the holder 30 is set to be smaller than a linear expansion coefficient of the base 40. According to this structure, even in a case that a focal position is shifted to an opposite side to the object side accompanied with rise in ambient temperature, it can be structured that the shift is absorbed by displacement of the position of the imaging element 21 to an opposite side to the object side depending on a difference of the linear expansion coefficients of the holder 30 and the base 40. On the other side, in a case that the focal position of the wide angle lens 1 (the plurality of the lenses 10) is shifted to the object side accompanied with a temperature rise (rise in ambient temperature), a structure can be preferably adopted that a linear expansion coefficient of the holder 30 is larger than a linear expansion coefficient of the base 40. According to this structure, even in a case that a focal position is shifted to the object side accompanied with rise in ambient temperature, it can be structured that the shift is absorbed by displacement of the position of the imaging element 21 to the object side depending on a difference of the linear expansion coefficients of the holder 30 and the base 40.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit comprising:
   a plurality of lenses;
   an imaging element which receives light transmitted through the plurality of the lenses;
   a circuit board on which the imaging element is mounted;
   a holder comprising a tube part which holds the plurality of the lenses on an inner side; and
   a base comprising a holder holding part in a tube shape which holds the holder on an inner side and a circuit board holding part which holds the circuit board;
   wherein an inner peripheral face of the holder holding part comprises a guide part which determines a first center axial line that is a reference,
   an outer peripheral face of the tube part comprises a guided part which determines a second center axial line coincided with an optical axis of the plurality of the lenses,
   the guided part is positioned by the guide part so that the first center axial line and the second center axial line are coincided with each other,
   the circuit board holding part comprises a positioning part with which the circuit board is abutted from an opposite side to an object side,
   at least one of the circuit board holding part and the circuit board comprises a fixed part through which the circuit board is fixed to the circuit board holding part so that a position of the circuit board to the circuit board holding part is capable of being adjusted in a direction perpendicular to the first center axial line,
   an inner peripheral face of the holder holding part is formed with a female screw on the opposite side to the object side with respect to the guide part,
   an outer peripheral face of the tube part is formed with a male screw meshing with the female screw on the opposite side to the object side with respect to the guided part, and
   the plurality of the lenses comprise a cemented lens overlapping with the male screw when viewed in a direction perpendicular to the optical axis.

2. The optical unit according to claim 1, wherein
   the fixed part is a hole through which a screw for fixing the circuit board to the base is penetrated, and
   an inner diameter of the hole is larger than an outer diameter of the screw.

3. The optical unit according to claim 2, wherein
   the circuit board holding part of the base comprises a body part in a tube shape which is protruded toward an outer side in a radial direction from an end part on the opposite side to the object side of the holder holding part and protruded to an imaging element side,
   the hole is provided in each of the body part and the circuit board so as to be penetrated through, and
   an end face on the imaging element side of the body part is formed to be a positioning flat face as the positioning part with which the circuit board is abutted.

4. The optical unit according to claim 2, wherein
   the circuit board holding part of the base comprises a body part in a tube shape which is protruded toward an outer side in a radial direction from an end part on the opposite side to the object side of the holder holding part and protruded to an imaging element side, the circuit board is provided with the hole which penetrates through the circuit board, and an end face on the imaging element side of the body part is formed to be a positioning flat face as the positioning part with which the circuit board is abutted.

5. The optical unit according to claim 1, wherein an outer diameter of an intermediate part of the male screw in an optical axis direction is smaller than outer diameters of both end parts of the male screw which are adjacent to the intermediate part in the optical axis direction.

6. The optical unit according to claim 1, wherein
an outer diameter of the guided part is larger than an outer diameter of the male screw,
an inner diameter of the guide part is larger than an inner diameter of the female screw and the outer diameter of the male screw, and
the guided part is positioned in a radial direction by the guide part so that the first center axial line and the second center axial line are coincided with each other.

7. The optical unit according to claim 1, further comprising a thickness-reducing recessed part which is formed between an inner peripheral face of the tube part and the outer peripheral face of the tube part so as to be recessed from an end part on the opposite side to the object side of the tube part,
wherein the thickness-reducing recessed part is overlapped with the male screw when viewed in a direction perpendicular to the optical axis.

8. The optical unit according to claim 7, wherein the recessed part is overlapped with the guided part when viewed in the direction perpendicular to the optical axis.

9. The optical unit according to claim 8, wherein
an outer diameter of the guided part is larger than an outer diameter of the male screw,
an inner diameter of the guide part is larger than an inner diameter of the female screw and the outer diameter of the male screw, and
the guided part is positioned in a radial direction by the guide part so that the first center axial line and the second center axial line are coincided with each other.

10. An optical unit comprising:
a plurality of lenses;
an imaging element which receives light transmitted through the plurality of the lenses;
a circuit board on which the imaging element is mounted;
a holder comprising a tube part which holds the plurality of the lenses on an inner side; and
a base comprising a holder holding part in a tube shape which holds the holder on an inner side and a circuit board holding part which holds the circuit board;
wherein an inner peripheral face of the holder holding part comprises a guide part which determines a first center axial line that is a reference,
an outer peripheral face of the tube part comprises a guided part which determines a second center axial line coincided with an optical axis of the plurality of the lenses,
the guided part is positioned by the guide part so that the first center axial line and the second center axial line are coincided with each other, the circuit board holding part comprises a positioning part with which the circuit board is abutted from an opposite side to an object side,
at least one of the circuit board holding part and the circuit board comprises a fixed part through which the circuit board is fixed to the circuit board holding part so that a position of the circuit board to the circuit board holding part is capable of being adjusted in a direction perpendicular to the first center axial line,
an inner peripheral face of the holder holding part is formed with a female screw on the opposite side to the object side with respect to the guide part,
an outer peripheral face of the tube part is formed with a male screw meshing with the female screw on the opposite side to the object side with respect to the guided part, and
the guided part is provided with a flat face part faced to a direction perpendicular to the second center axial line.

11. The optical unit according to claim 10, wherein a parting line is located in the flat face part.

12. The optical unit according to claim 10, wherein the plurality of the lenses comprise a cemented lens overlapping with the male screw when viewed in a direction perpendicular to the optical axis.

13. The optical unit according to claim 12, wherein
an outer diameter of the guided part is larger than an outer diameter of the male screw,
an inner diameter of the guide part is larger than an inner diameter of the female screw and the outer diameter of the male screw, and
the guided part is positioned in a radial direction by the guide part so that the first center axial line and the second center axial line are coincided with each other.

14. The optical unit according to claim 1, wherein
a focal position of the plurality of the lenses is shifted to the opposite side to the object side accompanied with a temperature rise, and
a linear expansion coefficient of the holder is smaller than a linear expansion coefficient of the base.

15. The optical unit according to claim 1, wherein
a focal position of the plurality of the lenses is shifted to the object side accompanied with a temperature rise, and
a linear expansion coefficient of the holder is larger than a linear expansion coefficient of the base.

16. The optical unit according to claim 10, wherein
a focal position of the plurality of the lenses is shifted to the opposite side to the object side accompanied with a temperature rise, and
a linear expansion coefficient of the holder is smaller than a linear expansion coefficient of the base.

17. The optical unit according to claim 10, wherein
a focal position of the plurality of the lenses is shifted to the object side accompanied with a temperature rise, and
a linear expansion coefficient of the holder is larger than a linear expansion coefficient of the base.

* * * * *